(12) United States Patent
Nishigaki

(10) Patent No.: US 6,744,926 B1
(45) Date of Patent: Jun. 1, 2004

(54) SYSTEM AND METHOD TO COMPRESS IMAGE DATA USING FIXED AND VARIABLE LENGTH COMPRESSION

(75) Inventor: Junji Nishigaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/363,551

(22) Filed: Jul. 29, 1999

(30) Foreign Application Priority Data

Jul. 31, 1998 (JP) .......................................... 10-217020

(51) Int. Cl.[7] .............................. G06K 9/36; G06K 9/46
(52) U.S. Cl. ........................ 382/239; 382/166; 382/176
(58) Field of Search ................................. 382/166, 176, 382/199, 232, 239, 243, 244–248, 250–251

(56) References Cited

U.S. PATENT DOCUMENTS

| 5,060,083 | A | * | 10/1991 | Ueno ........................ 358/464 |
| 5,333,212 | A | * | 7/1994 | Ligtenberg .................. 382/250 |
| 5,517,327 | A | * | 5/1996 | Nakatani et al. ............ 358/462 |
| 5,901,278 | A | * | 5/1999 | Kurihara et al. ............ 358/1.15 |
| 5,987,176 | A | | 11/1999 | Imaizumi et al. ............ 382/232 |
| 5,991,515 | A | * | 11/1999 | Fall et al. .................. 358/1.15 |
| 6,118,552 | A | * | 9/2000 | Suzuki et al. ............... 358/432 |
| 6,144,772 | A | * | 11/2000 | Garland et al. ............. 382/239 |
| 6,268,935 | B1 | * | 7/2001 | Kingetsu et al. ............ 358/433 |

FOREIGN PATENT DOCUMENTS

| JP | 06-334870 | 12/1994 | |
| JP | 07-131641 | 5/1995 | |
| JP | A 9-9040 | 10/1997 | .......... H04N/1/387 |
| JP | 10-51642 | 2/1998 | |

* cited by examiner

Primary Examiner—Timothy M. Johnson
(74) Attorney, Agent, or Firm—Morrison & Foerster, LLP

(57) ABSTRACT

When document image data are compressed, the data are divided into blocks including a plurality of adjacent pixels and are compressed according to attribute of the block in the unit of block. A plurality of encoders are provided for secondary encoding according to the type of image data, and one of them is selected appropriately according to the data type of the entire document. The data are compressed in the unit of block according to the decided attribute and the document type. Alternately, an input section received a compression ratio, and a second compression section compresses the image data further at the compression ratio.

13 Claims, 9 Drawing Sheets

SYSTEM AND METHOD TO COMPRESS IMAGE DATA USING FIXED AND VARIABLE LENGTH COMPRESSION

This application is based on an application No. 10-217020 filed in Japan, the contents of which are hereby incorporated by reference.

TECHNICAL FIELD OF THE INVENTION

The present invention relates to compression of image data.

BACKGROUND OF THE INVENTION

Various encoding techniques are used for multi-level image data received from an image reader such as a scanner. For example, JPEG (Joint Photographic Experts Group) using discrete cosine transform is a representative technique of variable-length coding of a still image, and it has an advantage of a high compression rate. However, JPEG has problems. For example, it needs a large-scale circuit and its process speed is lowered for the discrete cosine transform. Data processing is also not possible on the compressed data.

On the other hand, block truncation coding for multi-level image data is a fixed-length coding technique. In block truncation coding, pixels are divided into blocks consisting of a plurality of adjacent pixels. By using a characteristic that data of the pixels in a block are similar to each other, a smaller number of gradation levels than that of the original image is assigned. That is, average information and gradation distribution information of the multi-level image data are calculated, and the original image data is quantized at the smaller number of gradation levels based on the average and the gradation distribution of the multi-level image data. The obtained data on the average and the gradation width of a block, and the code data of each pixel therein are used as encoded data of the block.

The block truncation coding has a problem that compression ratio is small. For example, it is 3/8 for a block of 4*4 pixels. Then, it is proposed to increase the compression ratio further. For example, when the gradation width information is zero, a number of continuous blocks having the gradation width information of zero is counted, and the average information and the count are stored (Japanese Patent laid open Publication 6-334870). However, this technique has a bad compression ratio because compression is impossible when the average information is different in a number of continuous blocks even if the gradation width information thereof is zero.

On the other hand, it is also a problem that if a document including a photograph portion is compressed at a high compression ratio, the image obtained by decoding has low image quality on the photograph portion. Thus, a high compression ratio is not desirable when the quality of an image obtained by encoding is important. Therefore, an image encoder has to take image quality into account.

SUMMARY OF THE INVENTION

The present invention provides an image processor which compresses data appropriately by taking features of the image to be compressed into account.

The present invention also provides an image processor which compresses data appropriately by taking the image quality into account.

In one embodiment of the invention, in an image encoder, a first compression section compresses the image data, divided to a plurality of blocks having a predetermined size, in the unit of block. Further, an attribute decider decides an attribute of the image data for each block, and a document type decider decides a type of the image including a block to be processed. Then, a second compression section compresses further compresses image data according to the attribute of each block and the document type.

In a second embodiment of the invention, in an image encoder, a first compression section compresses the image data, divided to a plurality of blocks having a predetermined size, in the unit of block. An attribute decider decides an attribute of the image data for each block, and a second compression section compresses further the compressed image data according to the attribute of each block.

In a third embodiment of the invention, in an image encoder, a first compression section compresses the image data, divided to a plurality of blocks having a predetermined size, in the unit of block. On the other hand, a compression ratio is received at an input section. Then, a second compression section compresses further the compressed data at the compression ratio.

An advantage of the present invention is that the image data are compressed appropriately in the unit of block of a plurality of pixels according to the attribute of the image and the document type.

Another advantage of the present invention is that the image data can be compressed in the unit of block appropriately according to the attribute of block.

A further advantage of the present invention is that the image data can be compressed secondarily according to a compression ratio by taking the type of image into account.

BRIEF DESCRIPTION OF THE DRAWINGS

The present invention will become clear from the following description taken in conjunction with the preferred embodiments thereof with reference to the accompanying drawings, and in which.

DETAILED DESCRIPTION OF THE PREFERRED EMBODIMENTS

Figure 1:
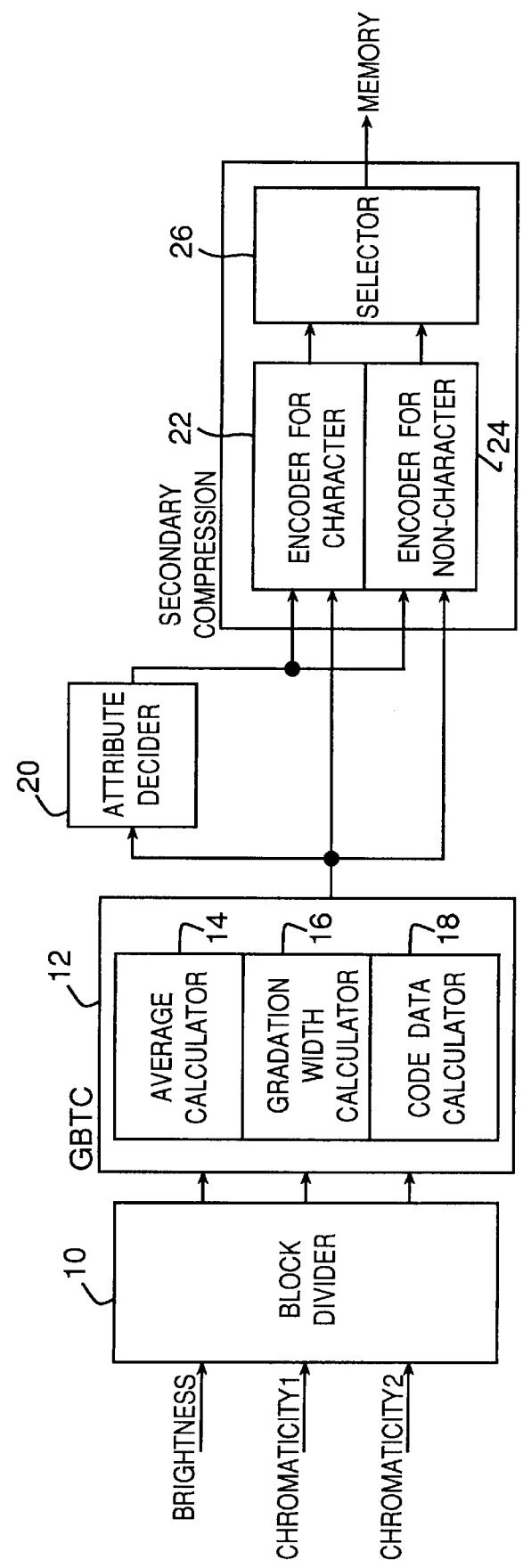
FIG. 1 is a block diagram of a first embodiment of the invention.

Referring now to the drawings, wherein like reference characters designate like or corresponding parts throughout the several views, image processors according to embodiments of the invention are explained which combine first compression (fixed-length block truncation coding) with secondary compression (variable length coding) of image data. FIG. 1 shows an image processor according to a first embodiment of the invention which has a GBTC (generalized block truncation coding) section and a secondary compression section including an encoder for character and another encoder for non-character. The encoder for character or for non-character is selected according to document type. An attribute is decided for each block according to GBTC coding data, and the secondary compression section encodes the data further according to the attribute.

The image processor will be explained below in detail. Input image data of the brightness and chromaticity data converted from red (R), green (G) and blue (B) are sampled so that a ratio of brightness data to chromaticity data=4:1. Then, the image data are received by a block divider 10 to be divided into blocks of 4*4 pixels. Next, in a GBTC section 12, the image data (brightness, chromaticity 1 and chromaticity 2) are encoded for each block as characters and code information according to generalized block truncation coding (GBTC). That is, in the GBTC section 12, an average calculator 14 calculates average information LA, a gradation width calculator 16 calculates gradation width information LD in each block, and a code data calculator 18 calculates code data $\phi_{ij}$ for each pixel in the block according to known block truncation coding. Next, an attribute decider 20 decides an attribute (in this example, white background, black character, non-edge color or edge color) in the unit of 2*2 blocks of 8*8 pixels from the determined characters (LA and LD) thereof. It is to be noted that because the brightness and the chromaticity data are sampled at 4:1, one attribute is assigned for the four blocks of 8*8 pixels on the brightness and the chromaticity data.

Next, secondary compression is performed according to the decided attribute by a first compressor 22 for character and a second compressor 24 for non-character. As shown in Table 1, the compressor 22 for character encodes further the data obtained by GBTC according to each attribute by laying weight to character, while as shown in Table 2, the compressor 24 for non-character encodes further the compressed according to each attribute by laying weight to non-character.

TABLE 1

Encoding with weight on character

| Attr. Type | Attr. data | Data to be stored on encoding | Code bits in 8*8 pixels | Compression ratio (bit/pixel) |
|---|---|---|---|---|
| White Background | 00 | No data | 0 | 0 |
| Black Character | 01 | Each $\phi_{ij}$ in GBTC data on brightness | 192 | 3 |
| Non-edge color | 10 | Only LA in GBTC data on brightness and chromaticity | 48 | 0.75 |
| Edge color | 11 | All GBTC data on brightness and chromaticity | 288 | 4.5 |

TABLE 2

Encoding with weight on non-character

| Attr. Type | Attr. data | Data to be stored on encoding | Code bits in 8*8 pixels | Compression ratio (bit/pixel) |
|---|---|---|---|---|
| White Background | 00 | No data | 0 | 0 |
| Black Character | 01 | Each $\phi_{ij}$ in GBTC Data on brightness | 64 | 1 |
| Non-edge color | 10 | All GBTC data on Brightness and Chromaticity | 288 | 4.5 |

TABLE 2-continued

Encoding with weight on non-character

| Attr. Type | Attr. data | Data to be stored on encoding | Code bits in 8*8 pixels | Compression ratio (bit/pixel) |
|---|---|---|---|---|
| Edge color | 11 | All GBTC data on brightness and chromaticity | 288 | 4.5 |

Figure 2:
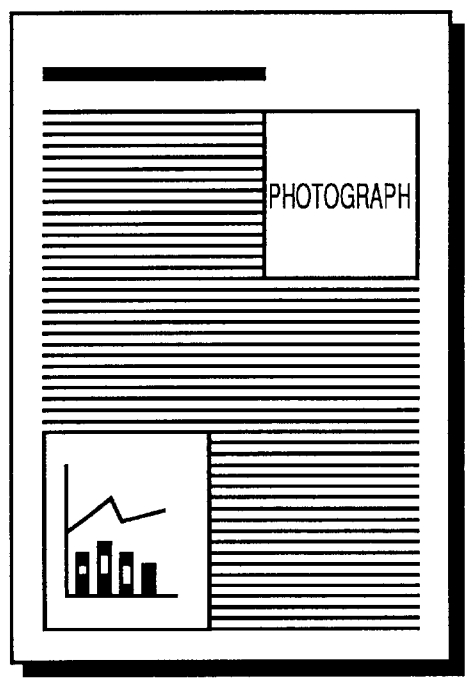
FIG. 2 is a diagram of an example of a character document.
Figure 3:
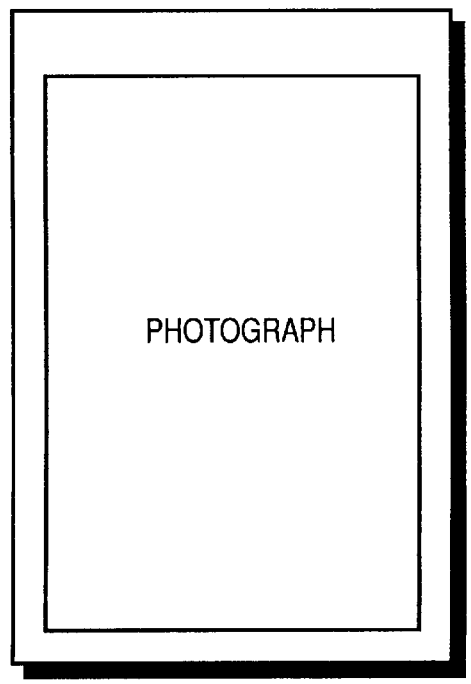
FIG. 3 is a diagram of an example of a photograph document.

A selector 26 selects among the data compressed by the first encoder 22 or those by the second encoder 24 according to the document type (character/photograph). That is, for a character document, data compressed by the first encoder 22 with weight to character are used, while for photograph document, data compressed by the second encoder 24 with weight to non-character are used. FIG. 2 shows an example of a character document on which the characters should be reproduced well, and FIG. 3 shows an example of a photograph document on which the photograph should be reproduced well. The mode can be set manually by a user in an operational panel or according to automatic decision on image information obtained by prescan of the document. The selected data are stored in a memory.

In the encoding, when the document type is character document, the compression ratio is decreased in character areas to lay weight on character reproduction while it is increased in non-character areas to lay weight on compression ratio. On the other hand, when the document type is a non-character document, the compression ratio is increased in character areas to lay weight on compression ratio while it is decreased in non-character areas to lay weight on image quality.

Block truncation coding is performed in the average calculator 14, the gradation width calculator 16 and the code data calculator 18, as explained below in detail. (This coding is realized as a hardware circuit or a software program, but it is not explained here in detail.) First, from all the pixel data $X_{ij}$ in a block extracted in the unit of block of 4*4 pixels, the parameters necessary for encoding, that is, 8-bit average information LA and 8-bit gradation width information LD are calculated as will be explained below. The maximum $L_{max}$ and the minimum $L_{min}$ in 8-bit image data are first determined in a block of 4*4 pixels. Next, parameters P1 and P2 are obtained based on the maximum $L_{max}$ and the minimum $L_{min}$. The parameters P1 and P2 are calculated according to the following Equations (1) and (2).

$$P1 = (L_{max} + 3*L_{min})/4, \quad (1)$$

and $$P2 = (3*L_{max} + L_{min})/4. \quad (2)$$

Next, an average Q1 of the pixel data equal to or smaller than the parameter P1 is determined. Further, another average Q4 of the pixel data equal to or larger than the parameter P2 is determined. Based on the averages Q1 and Q4, the average information LA=(Q1+Q2)/2 and the gradation width information LD=Q4−Q1 are calculated by the average calculator 14 and the gradation width calculator 16.

Next, as to block data of the 4*4 pixels (each having 8 bits or 256 gradation levels), the code calculator 18 converts the pixel data $X_{ij}$ at i-th column and j-th line to 2-bit code information $\Phi_{ij}$ (i, j=1, 2, 3, 4) by using the LA and LD determined above. First, reference values L1 and L2 used for encoding are calculated as follows.

$$L1 = LA - LD/4, \quad (3)$$

and $$L2 = LA + LD/4. \tag{4}$$

Then, the code data $\Phi_{ij}$ is assigned according to pixel data $X_{ij}$ as follows.

$\phi_{ij}=00$ if $L1 \geq X_{ij}$, $\phi_{ij}=01$ if $LA > X_{ij} > L1$, $\phi_{ij}=10$ if $L2 > X_{ij} > LA$, \hfill (5)

and $\phi_{ij}=11$ if $X_{ij} > L2$.

That is, the image data are classified into four data values according the pixel data in the block. The relationship with reference to the values of L1, LA and L2, and 2-bit code $\phi_{ij}$ is determined for each data block.

The obtained data includes the code data $\phi_{ij}$ of 16 pixels in the block (16*2 bits), the 1-byte gradation width information LD (8 bits) and the 1-byte avergae information LA (8 bits). By performing the above calculation over the entire area of the document image, the image data of the entire document can be compressed. Then, the data of a block of 4×4 pixels (8 bits* 16) are converted to LA (8 bits), LD (8 bits) and $\phi_{ij}$ (2 bits* 16=32 bits), so that the encoded data have been compressed to 3/8 of the amount of the data of the original image.

On decoding, the encoded data ID1 (LA, LD and $\phi_{ij}$) for a block to be decoded are read and converted to data ID of 8 bits for each pixel to be supplied to an image forming device or the like. Thus, when the data encoded by block truncation coding are decoded, the gradation width information LD and the average information LA are used. In concrete, the image data are replaced to four values of 256-gradation-level $Y_{ij}$ for a pixel $X_{ij}$ at the i-th column and at the j-th line in correspondence to the gradation width information LD, the average information LA and the code data $\phi_{ij}$.

$Y_{ij}=LA-LD/2$ if $\phi_{ij}=00$, $Y_{ij}=LA-LD/6$ if $\phi_{ij}=01$, $Y_{ij}=LA+LD/6$ if $X_{ij}=10$, \hfill (6)

and $Y_{ij}=LA+LD/2$ if $\phi_{ij}=11$.

The image obtained by the above-mentioned encoding and decoding is classified to four image data $Y_{ij}$ in each block, so that there are errors in data with respect to the original image. However, because the error level is very unnoticeable with respect to the visual characteristics of human eyes, deterioration of image quality due to the compression of a natural image is inappreciable. On the other hand, the parameters Q1 and Q4 are recovered completely from the gradation width LD and the average LA included in the encoded data. Therefore, when a bi-level image such as a dither pattern, has black portions equal to or smaller than the parameter P1 and white portions equal to or larger than the parameter P2, it is recovered completely from the encoded data. The compressed image data are recovered by the reverse operation of the encoding to an image similar to the original image with relatively low deterioration.

Figure 4:
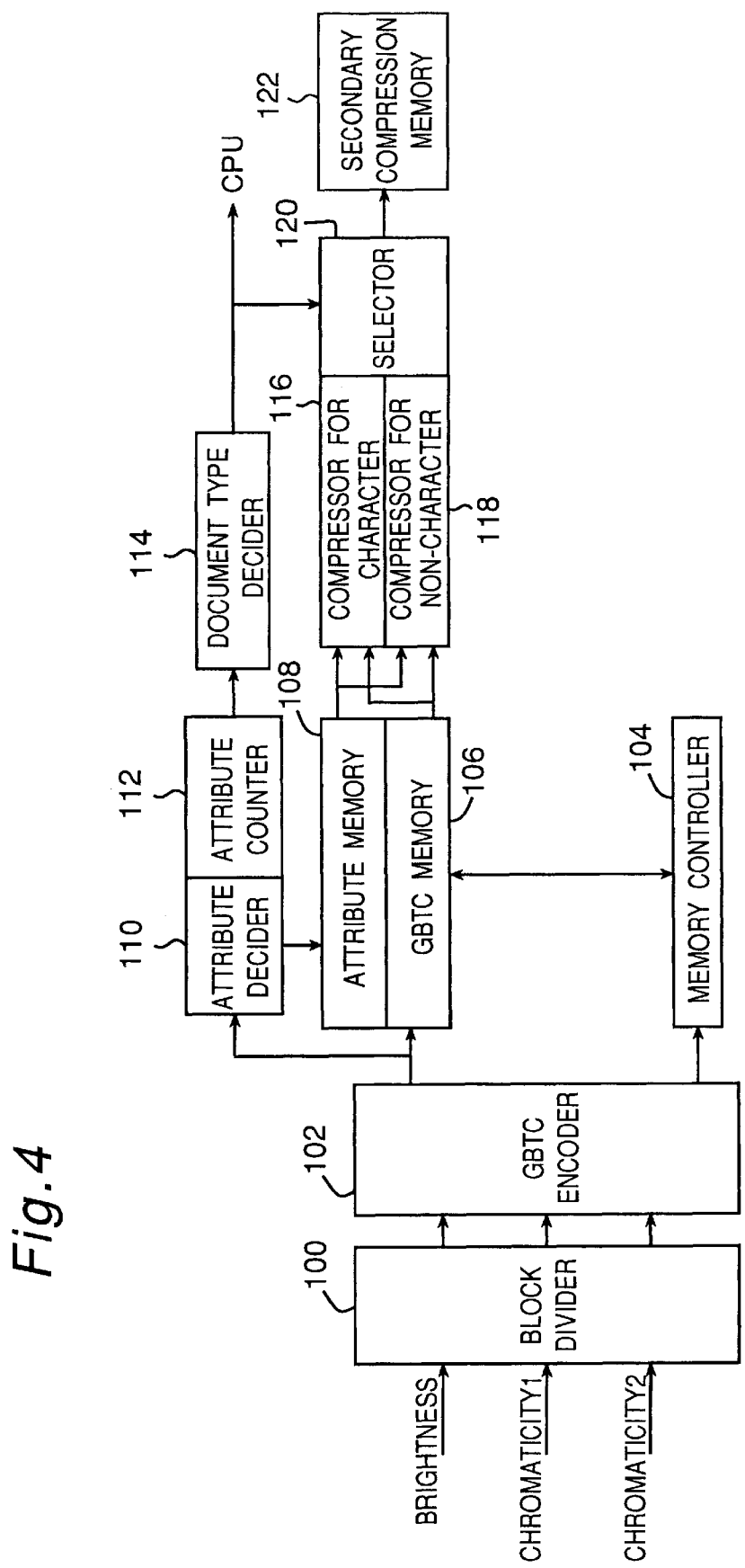
FIG. 4 is a block diagram of an encoding section of an image processor of a first embodiment of the invention.

FIG. 4 shows an image processor according to a second embodiment of the invention. Similarly to the image processor according to the first embodiment, it has a GBTC (generalized block truncation coding) section and a secondary compression section including an encoder for character and another encoder for non-character. The encoder for character or that for non-character is selected according to the document type. An attribute is decided for each block according to the GBTC code data, and the secondary compression section compresses the data further according to the attribute. The document type is decided based on the result of attribute decision on the blocks in the entire document.

The image processor will be explained below in detail. Input image data of the brightness and chromaticity data converted from red (R), green (G) and blue (B) are sampled so that brightness data to chromaticity data=4:1. Then, a block divider 100 received the image data and divides them into blocks consisting of 4*4 pixels. Next, in a GBTC section 102, the image data (brightness, chromaticity 1 and chromaticity 2) are encoded for each block according to generalized block truncation coding (GBTC), similarly to the first embodiment. The encoded data includes code data ($\phi_{ij}$) for 16 pixels (2 bits* 16), the 1-byte average information LA (8 bits), and the 1-byte gradation width information LD (8 bits), and they are stored in a GBTC memory 106. An attribute decider 110 decides an attribute of edge or non-edge based on the GBTC encoded data, and the obtained attribute is written to an attribute memory 108. Further, an attribute counter 112 counts numbers of edge and non-edge attributes. After the attribute decision is completed on all the blocks, the document type decider 114 determines, based on the attribute distribution, whether the document is a character document or a non-character document. It is decided that the document is a character document when (the number of edge attribute plus that of non-edge attribute)/total attribute number is equal to or larger than a predetermined number, otherwise it is decided that the document is a non-character document. Then, the document type (character document or non-character document) for the document is registered in a management table in the document type decider 114.

Next, secondary compression is performed according to the decided attribute. First, a selector 120 reads the attribute data and the GBTC data. Based on the document type signal from the management table in th e document type decider 114, when the document type signal is character document, the secondary compression is performed by a first compressor 116 by laying weight to character, while when the document type signal is non-character document, the secondary compression is performed by a second compressor 118 by laying weight to non-character. The obtained compression data are written to a secondary compression memory 122. This secondary compression is repeated on all the blocks.

Figure 5:
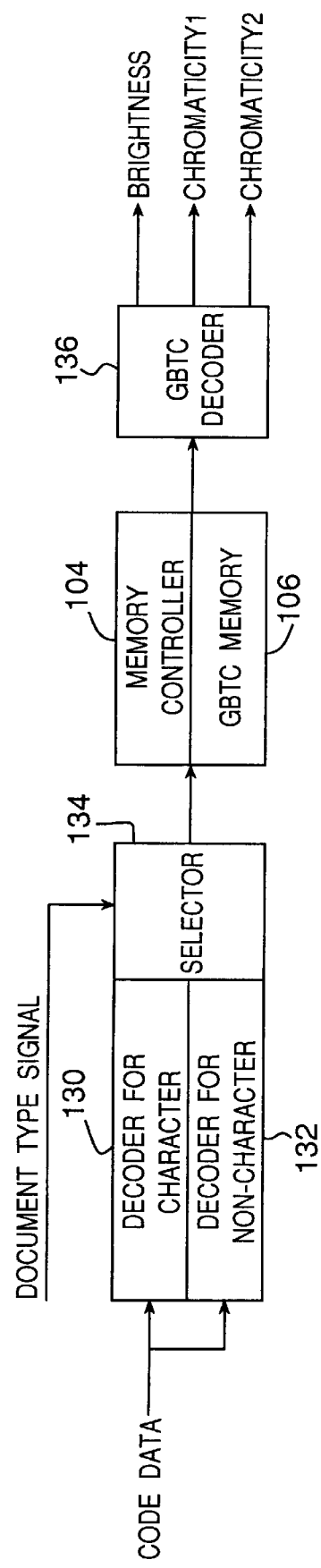
FIG. 5 is a flowchart of encoding.

FIG. 5 shows a decoding portion in the image processor. On decoding, a selector 134 selects decoding with weight to character by a first decoder 130 or decoding with weight to non-character by a second decoder 132 according to the document type signal. The first decoder 130 decodes the compression data with weight to character, as shown in Table 3, while the second decoder 132 decodes the compression data with weight to non-character, as shown in Table 4. The GBTC data obtained by the decoding are written to the GBTC memory 106. This is repeated on all the data in the secondary compression memory 122. Next, a GBTC decoder 136 reads the code data from the GBTC memory 106 to expand them to brightness and chromaticity data. This is repeated on all the data in the GBTC memory 106.

TABLE 3

Decoding of secondary compression data for emphasizing character

| Attr. Type | Attr. data | Code | Brightness*4 | | | Chromaticity*2 | | |
|---|---|---|---|---|---|---|---|---|
| | | | LA/ | LD/ | $\phi_{ij}$ | LA/ | LD/ | $\phi_{ij}$ |
| White Background | 00 | 0 | 255/ | 0/ | 0 | 127/ | 0/ | 0 |
| Black Character | 01 | 192 | (8b)/ | (8b)/ | (32b) | 127/ | 0/ | 0 |
| Non-edge | 10 | 48 | (8b)/ | 0/ | 0 | (8b)/ | 0/ | 0 |
| Edge | 11 | 288 | (8b)/ | (8b)/ | (32b) | (8b)/ | (8b)/ | (32b) |

NB: In this table, () represents assignment of code bits. For example, (8b) represents assignment of 8 bits.

TABLE 4

Decoding of secondary compression data for emphasizing non-character

| Attr. Type | Attr. data | Code | Brightness*4 | | | Chromaticity*2 | | |
|---|---|---|---|---|---|---|---|---|
| | | | LA/ | LD/ | $\phi_{ij}$ | LA/ | LD/ | $\phi_{ij}$ |
| White Background | 00 | 0 | 255/ | 0/ | 0 | 127/ | 0/ | 0 |
| Black Character | 01 | 64 | (8b)/ | (8b)/ | (16b) | 127/ | 0/ | 0 |
| Non-edge | 10 | 288 | (8b)/ | 8(b)/ | (32b) | (8b)/ | (8b)/ | (32b) |
| Edge | 11 | 288 | (8b)/ | (8b)/ | (32b) | (8b)/ | (8b)/ | (32b) |

NB: In this table, () represents assignment of code bits. For example, (8b) represents assignment of 8 bits.

Figure 6:
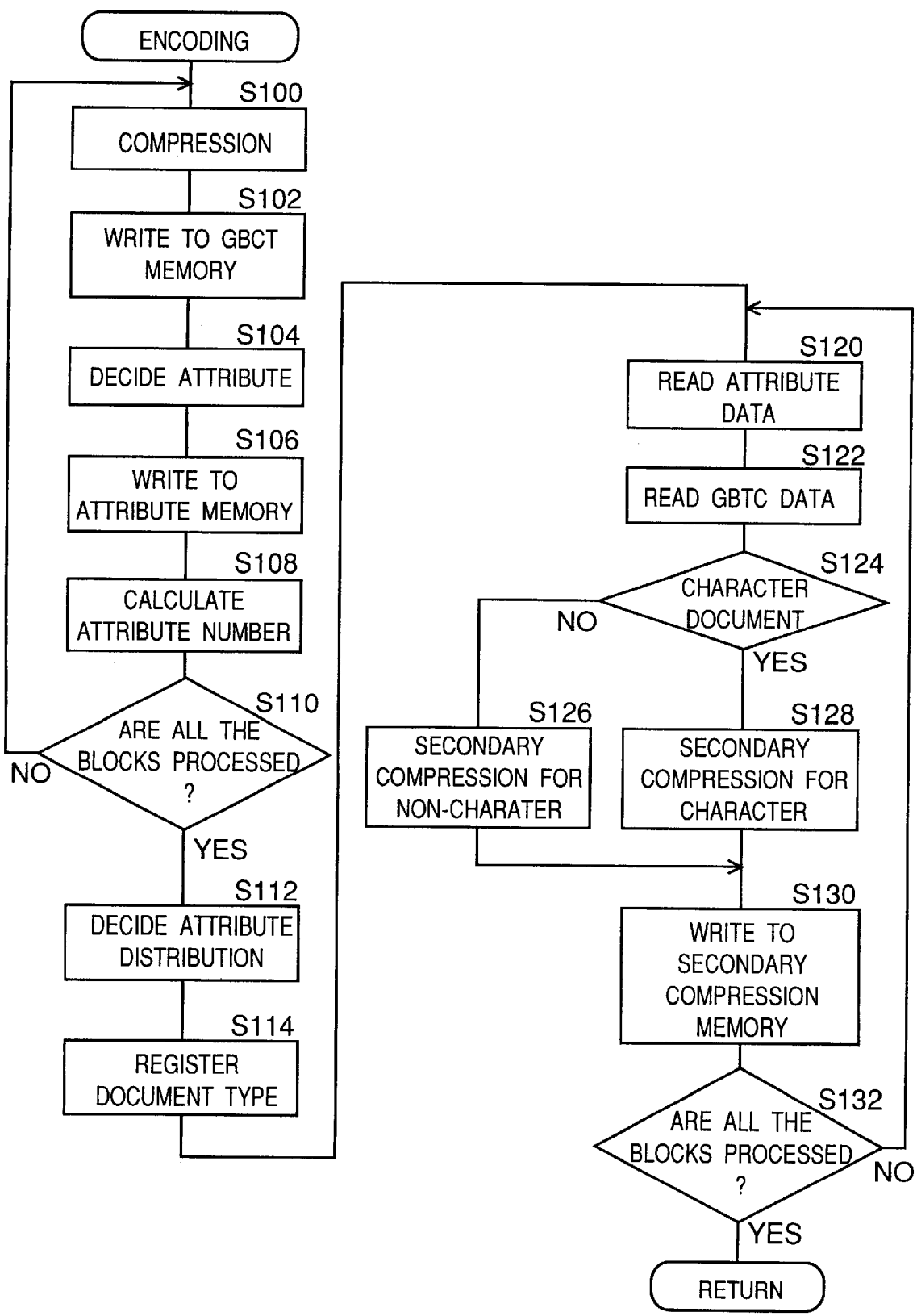
FIG. 6 is a flowchart of decoding.
Figure 7:
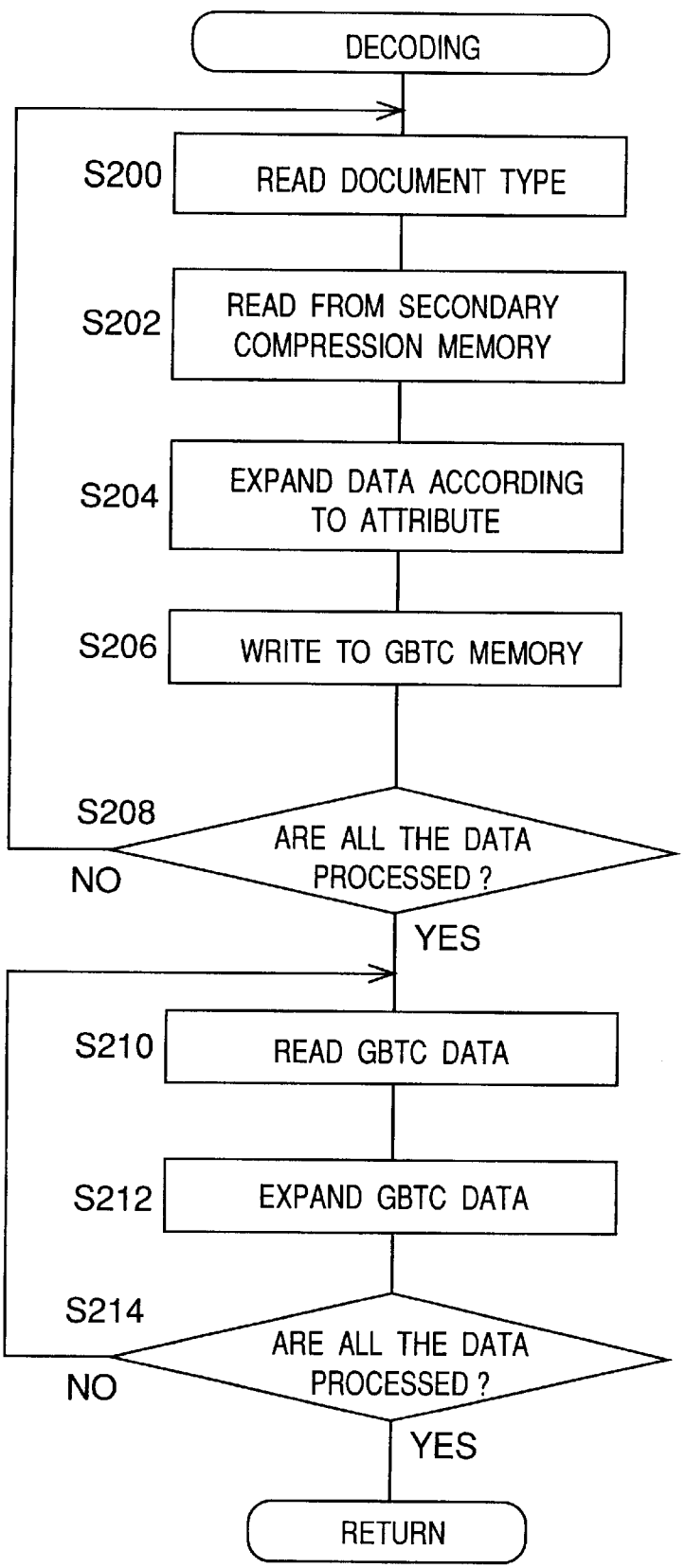
FIG. 7 is a block diagram of an encoding section of an image processor of a second embodiment of the invention.

The encoding and decoding explained above can also be processed with a software program. FIGS. 6 and 7 are flowcharts for the encoding and the decoding of a controller (central processing unit) which controls the image processor. In the flow of encoding shown in FIG. 6, the data are compressed with block truncation coding by the GBTC encoder 102 for each block (S100), and the encoded GBTC data are stored in the GBTC memory 106 under the control of the memory controller 104 (S102). Next, it is decided based on the GBTC data whether the attribute is edge attribute or non-edge attribute (S104), and the result is written to the attribute memory 108 (S106). Then, a sum of the edge attribute and that of the non-edge attribute are calculated according to the result of the attribute decision (S108). After the attribute decision is completed on all blocks (YES at S110), it is decided according to the attribute distribution whether the document is a character document or a non-character document (S112). If a ratio of the number of non-edge attribute to that of edge attribute is equal to or larger than a predetermined number, the document is decided as character document, otherwise it is decided as non-character document. Then, it is registered in the management table whether the document is character document or non-character document (S114).

Next, secondary compression is performed according to the determined attribute, as will be explained below. First, the attribute data and the GBTC data are read (S120 and S122). Then, if the document type signal from the management table is character document (YES at S124), the secondary compression is performed with emphasis on character (S126), while if the signal is character document (NO at S122), the secondary compression is performed with emphasis on non-character (S128). Then, the obtained compression data are written to the secondary compression memory (S130). The above-mentioned compression is repeated on all the blocks (S132).

In the flow of decoding shown in FIG. 7, the document type is read (S200), and the compression data are read from the secondary compression memory 122 (S202). Next, decoding with emphasis on character or on non-character is selected according to the document type wherein the data are decoded for each attribute (S204), and the obtained GBTC data are written to the GBTC memory 106 (S206). This is repeated on all the data in the secondary compression memory 122 (S208). Then, the GBTC data are read from the GBTC memory 106 (S210) and decoded to brightness and chromaticity data (S212). This is repeated on all the data in the GBTC memory 106 (S214).

Figure 8:
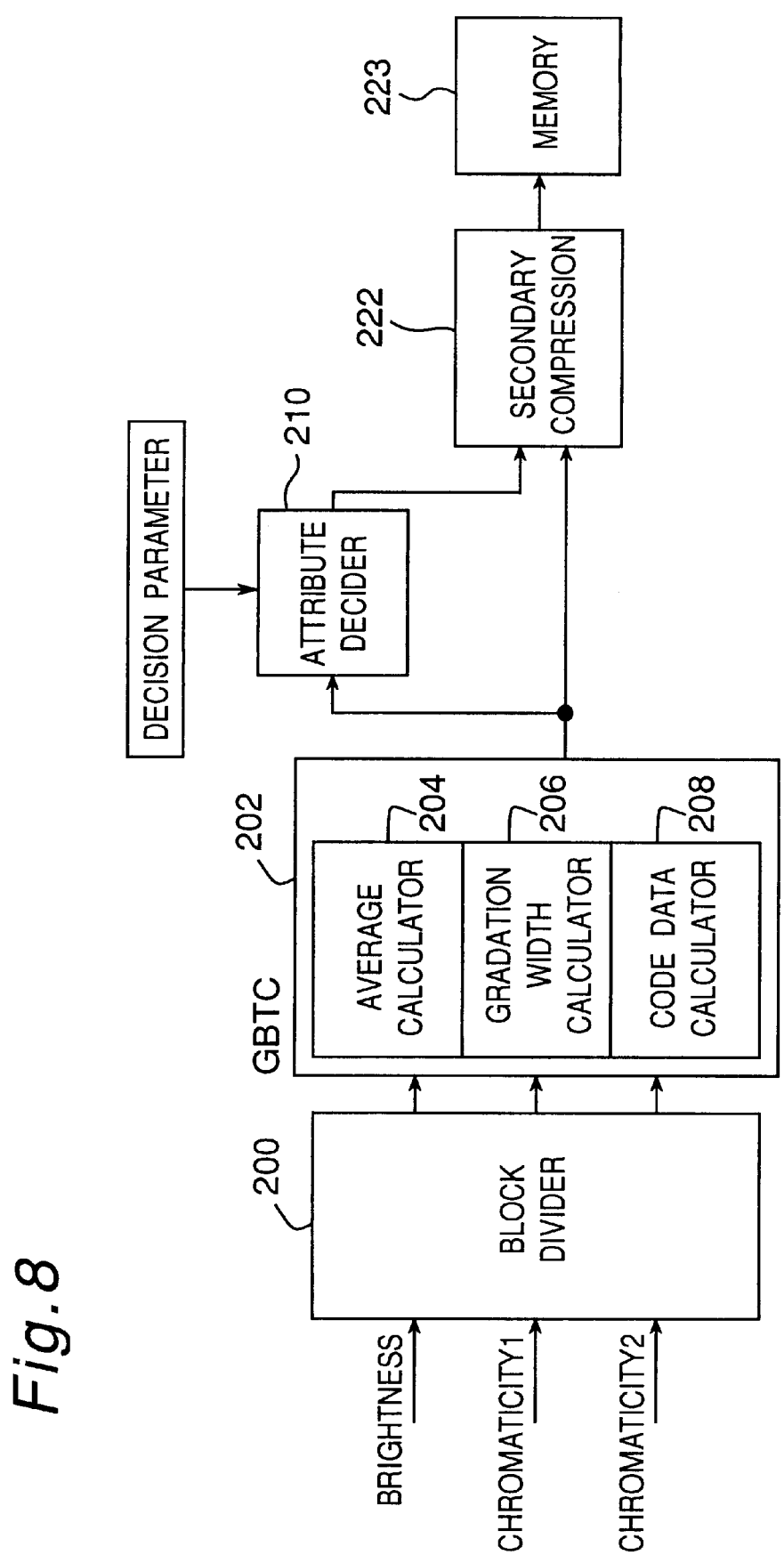
FIG. 8 is a block diagram of an encoding section of an image processor of a third embodiment of the invention.

FIG. 8 shows an image processor according to a third embodiment of the invention which has a GBTC section and a secondary compression section for secondary compression. In the image processor, an attribute is decided for each block according to characteristics of image data extracted from the GBTC coding data, and the secondary compression section encodes the data further according to the attribute.

The image processor will be explained below in detail. Input image data of red (R), green (G) and blue (B) are converted to the brightness and chromaticity 1, 2 data and sampled so that brightness data to chromaticity data=4:1. Then, a block divider 200 receives the image data and divides them into blocks of 4*4 pixels. Next, in a GBTC section 202, the image data (brightness, chromaticity 1 and chromaticity 2) are encoded for each block with block truncation coding by an average calculator 204, a gradation width calculator 206, and a code data calculator 208, similarly to the first embodiment. Thus, the data in a block of 4*4 pixels (8 bits*16) are converted to the average information LA (8 bits), the gradation width information LD (8 bits) and the code data $\phi_{ij}$ (2 bits*16=32 bits), so that the data are compressed to 3/8 of the original image data.

Figure 9:
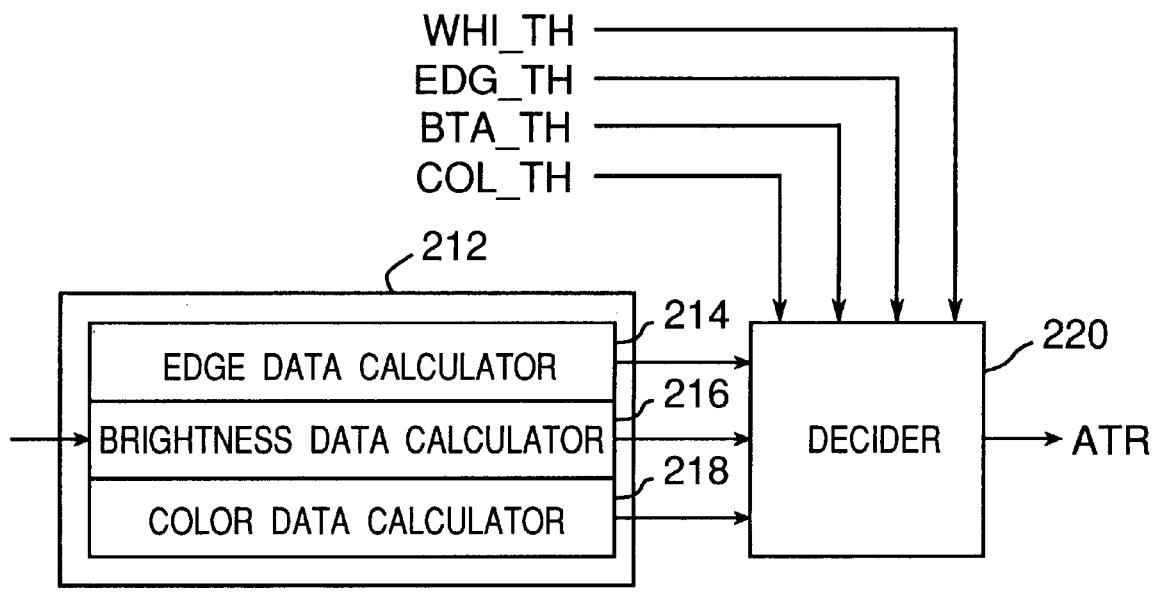
FIG. 9 is a block diagram of a characteristic decider.

Further, as shown in FIG. 9 in detail, a characteristics extractor 210 determines characteristics of the image (in this example, average information AVG, edge information SUB and color information COL) in the unit of attribute block (8*8 pixels) according to GBTC data (LA and LD) for the brightness and chromaticity data. That is, the GBTC data (LA and LD) for the brightness of four blocks and for chromaticity Cr, Cb of the two blocks are read as total data of 12 bytes. Next, an edge data calculator 214 in a characteristics extractor 212 calculates an average of LA or brightness data of the four blocks to provide the value as the average data AVG. A brightness data calculator 216 decides the maximum in LA of the four blocks to provide it as the edge data SUB. Further, a color data calculator 218 calculates the maxima in LA and LD (each 2 bytes) for brightness data of two blocks to provide it as the color data COL, as shown below.

$P\_MAX = LA(Cr) + LD(Cr)/2,$ $Q\_MAX = LA(Cb) + LD(Cb)/2,$ $P\_ABS = |P\_MAX - 127|,$ $Q\_ABS = |Q\_MAX - 127|,$ and $COL = MAX(P\_ABS, Q\_ABS).$ In the above processing, characteristics of the image are obtained on the GBTC data. However, they can also be determined before block truncation coding.

Next, a decider 220 decides attribute (white background/black character/non-edge color/edge color) in the unit of 8*8 pixels (2*2 blocks) by comparing the characteristics (average information AVG, edge information SUB and color information COL) with various decision parameters or thresholds (WHI_TH, EDG_TH, BTA_TH and COL_TH) and outputs the result as attribute ATR. In the attribute decision, (1) if COL<COL_TH, the attribute is decided as black character when SUB>EDG_TH. Further, (2) if COL≧COL_TH, the attribute is decided as white background when AVG>WHI_TH, (3) otherwise it is decided as black character. (4) If COL≧COL_TH, the attribute is decided as edge when SUB>BTA_TH, (5) otherwise it is decided as non-edge. In an example, the color decision parameter COL_TH is 10, and the white background decision parameter WHI_TH is 250, the edge decision parameter EDG_TH is 60, and the uniform density decision parameter BTA_TH is 10.

The values of the decision parameters (COL_TH, WHI_TH and EDG_TH) have been determined beforehand by experiments which take scanner characteristics into account. They are registered in the table, and the central processing unit which controls the image processor sets them. On the other hand, the decision parameter BTA_TH for uniform density image is set by a user or the like with an operational panel.

Figure 10:
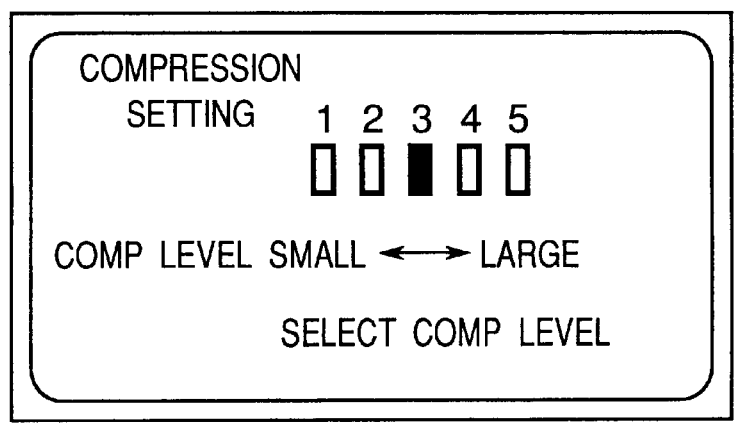
FIG. 10 is a diagram of a panel for setting compression level.

For example, as shown in FIG. 10, one of five compression levels can be selected in the panel. Compression level 3 is set in default. The parameter BTA_TH of 0, 5, 10, 15 or 20 is selected according to the compression level of 1, 2, 3, 4 or 5. A user can select the compression level according to a usage/purpose. For example, the compression level may be increased when the document includes many characters or when it is desired to store document as many as possible even if the compression ratio for photograph is increased. On the other hand, the compression level is decreased when the document includes many photographs and image quality is desired to be kept high even when the compression ratio is decreased or when many such document are not needed to be stored. When the compression level is 0, the data are not compressed and image quality is maintained high.

Table 5 shows an example of change in compression ratio according to the selection of compression level. In this example, between two compression levels of 2 and 4, a ratio of non-edge portions to edge portions is changed.

TABLE 5

An example of change in compression ratio according to the selection of compression level

| Compression level | White background | Black character | Non-edge color | Edge color | Compression ratio |
|---|---|---|---|---|---|
| 2 | 50 | 10 | 10 | 30 | 1/14 |
| 4 | 50 | 10 | 30 | 10 | 1/25 |

After the attribute is decided, the secondary compression section 222 performs secondary compression according to the attribute, as shown Table 1. The obtained code data are stored in a memory 223.

The decoding of the secondary compression data are performed as shown in Table 6.

TABLE 6

Decoding of secondary compression data

| Attr. Type | Attr. data | Code | Brightness*4 LA/ | LD/ | φij | Chromaticity*2 LA/ | LD/ | φij |
|---|---|---|---|---|---|---|---|---|
| White Background | 00 | 0 | 255/ | 0/ | 0 | 127/ | 0/ | 0 |
| Black Character | 01 | 191 | (8b)/ | (8b)/ | (32b) | 127/ | 0/ | 0 |

TABLE 6-continued

Decoding of secondary compression data

| Attr. Type | Attr. data | Code | Brightness*4 LA/ | LD/ | φij | Chromaticity*2 LA/ | LD/ | φij |
|---|---|---|---|---|---|---|---|---|
| Non-edge | 10 | 48 | (8b)/ | 0/ | 0 | (8b)/ | (8b)/ | (32b) |
| Edge | 11 | 288 | (8b)/ | (8b)/ | (32b) | (8b)/ | (8b)/ | (32b) |

NB: In this table, () represents assignment of code bits. For example, (8b) represents assignment of 8 bits.

Figure 11:
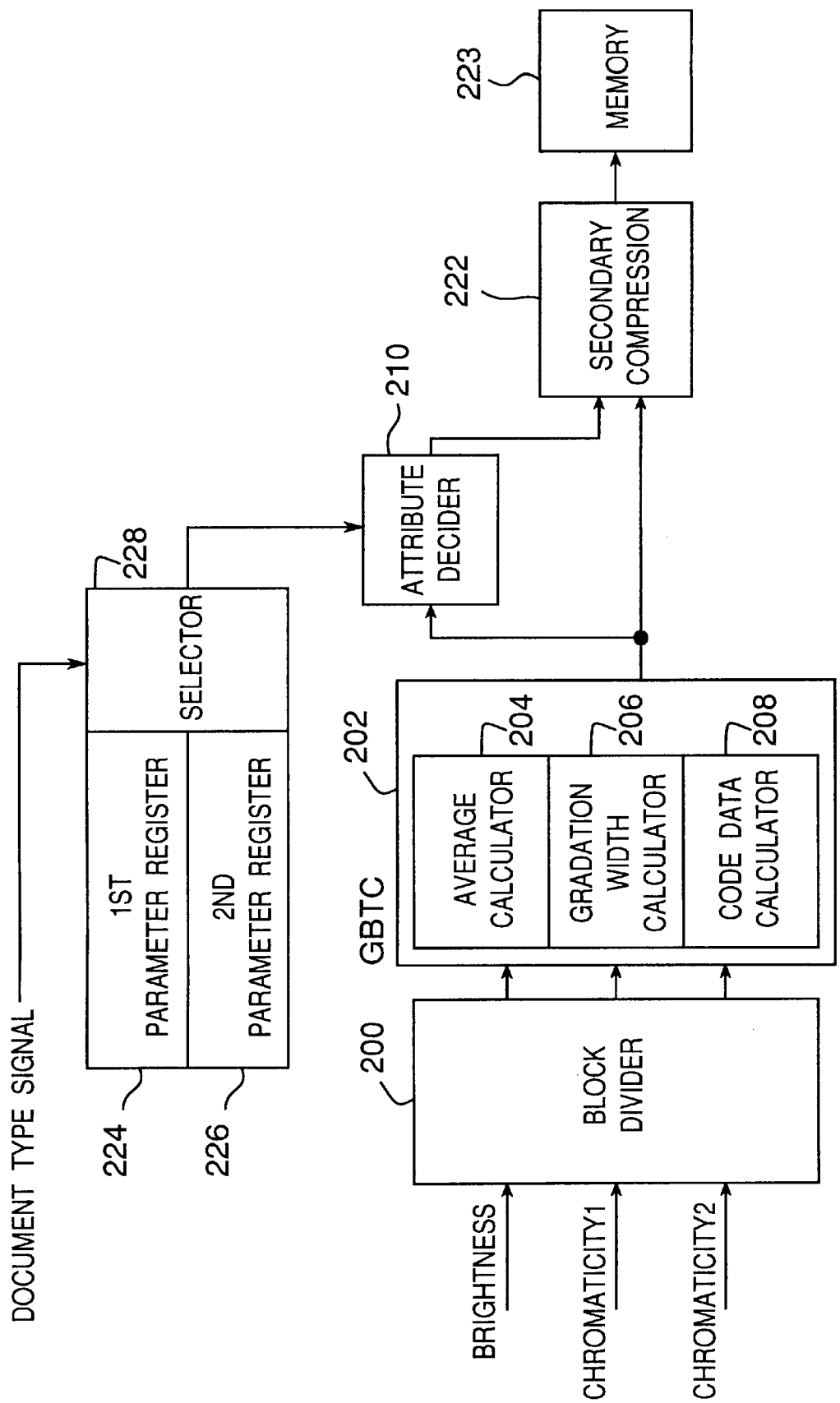
FIG. 11 is a block diagram of an encoding section of an image processor of a fourth embodiment of the invention.

FIG. 11 shows an image processor according to a fourth embodiment of the invention which has a GBTC section and a secondary compression section for secondary compression. In the image processor, an attribute is decided for each block according to characteristics extracted on the image data, and a secondary compression section encodes the data further according to the attribute. This image processor is different from that of the second embodiment in that the attribute is decided for each block according to document type.

In the image processor, a first parameter register 224 stores threshold parameters (COL_THA, WHI_THA, EDG_THA and BTA_THA) used for character document mode. On the other hand, a second parameter register 226 stores threshold parameters (COL_THB, WHI_THB, EDG_THB and BTA_THB) used for non-character document mode (photographs and the like). The threshold parameters (COL_THA, EHI_THA, EDG_THA, BTA_THA, COL_THB, EHI_THB, EDG_THB and BTA_THB) are written or read by the central processing unit, and they have been set in factories. Alternately, a serviceman or the like can set them for an image processor. For example, in the first parameter register 224, the parameter COL_TH for color is 10, the parameter WHI_TH for white background is 230, the parameter EDG_TH for edge is 60 and the parameter BTA_TH for uniform density is 20, while in the second parameter register 226, the parameter COL_TH is 10, the parameter WHI_TH is 250, the parameter EDG_TH is 100 and the parameter BTA_TH is 0. The attribute decision by using these parameters is performed similarly to the third embodiment.

A selector 228 selects the first or second parameter register 224, 226 to be used for the attribute decision according to the document type signal which represents whether the document is a character document or a non-character document. The document type signal can be set manually by a user with an operational panel or automatically according to the document type decision on the input image data.

In some embodiments, the document type is set on the entire document. However, it can also be set not on the entire document, but on a plurality of blocks around the block to be processed.

As explained above, in the above-mentioned image processors, it is advantageous that the image data are compressed appropriately according to the type of image in the unit of block consisting of a plurality of pixels. For example, for a character document, the compression ratio is decreased in character areas with weight on reproduction of character and increased in non-character areas with weight on compression ratio. On the other hand, for a non-character document, the compression ratio is increased in character areas with weight on compression ratio and decreased in non-character areas with weight on image quality.

Further, the image data can be compressed in the unit of block appropriately according to the attribute of block. For example, the image data are compressed appropriately according to attribute type such as white background, black character, non-edge color portion or edge color portion.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image encoder comprising:
   a divider which divides image data on a document to a plurality of blocks having a predetermined size;
   a first compression section which compresses the image data in the unit of block;
   an attribute decider which decides an attribute of the image data for each block;
   a document type decider which decides a type of the image including a block to be processed; and
   a second compression section which compresses further the image data which have been compressed by said first compression section for all document types according to the attribute of each block decided by the attribute decider and the document type decided by the document type decider.

2. The image encoder according to claim 1, wherein said first compression section compresses the image data with fixed length coding.

3. The image encoder according to claim 1, wherein said document type decider decides the document type based on the image data on the entire document.

4. The image encoder according to claim 3, wherein said document type decider decides the attribute of the image data of the document automatically based on the attribute data on all the blocks in the document decided by said attribute decider.

5. The image encoder according to claim 1, wherein the attribute decided by said attribute decider is character or non-character.

6. The image encoder according to claim 1, wherein the attribute decided by said attribute decider is white background, black character, non-edge color or edge color.

7. The image encoder according to claim 1, wherein said attribute decider decides the attribute of the image data for each block on the image data of a plurality of adjacent blocks.

8. The image encoder according to claim 1, further comprising a character decider which decides a character of the image data, wherein said attribute decider decide the attribute of the image data by using parameters in correspondence to the character decided by said character decider.

9. The image encoder according to claim 1, wherein said second compression section compresses the image data with weight on character reproduction when the document type decided by said document decider is character document and with weight on non-character reproduction when the document type decided by said document decider is non-character document.

10. An image encoder, comprising:
    a divider which divides image data on a document to a plurality of blocks having a i predetermined size;
    a first compression section which compresses the image data in the unit of a block;
    a document type decider which decides a type of the image including a block to be processed; and
    a second compression section which compresses further the image data which have been compressed by said first compression section for all document types according to the document type decided by said document type decider, regardless of the document type.

11. The image encoder according to claim 10, wherein said document type decider decides the document type based on the image data on the entire document.

12. The image encoder according to claim 11, wherein said document type decider decides the attribute of the image data of the document automatically based on the attribute data on all the blocks in the document decided by said attribute decider.

13. The image encoder according to claim 10, wherein said second compression section compresses the image data with weight on character reproduction when the document type decided by said document decider is a character document and with weight on non-character reproduction when the document type decided by said document decider is a non-character document.

* * * * *

UNITED STATES PATENT AND TRADEMARK OFFICE
CERTIFICATE OF CORRECTION

PATENT NO.    : 6,744,926 B1
DATED         : June 1, 2004
INVENTOR(S)   : Junji Nishigaki It is certified that error appears in the above-identified patent and that said Letters Patent is hereby corrected as shown below:

Title page,
Item [54], Title, please change "SYSTEM AND METHOD TO COMPRESS IMAGE DATA USING FIXED AND VARIABLE LENGTH COMPRESSION" to
-- FIXED AND VARIABLE LENGTH COMPRESSION BASED ON IMAGE ATTRIBUTES AND DOCUMENT TYPES --

Column 12,
Line 15, remove "i" between the words "a" and "predetermined."

Signed and Sealed this

Twenty-eighth Day of June, 2005

JON W. DUDAS
*Director of the United States Patent and Trademark Office*